United States Patent
Klimstra

[15] 3,705,180
[45] Dec. 5, 1972

[54] 17-OXYGENATE-1-ALPHA&METHYL-2-METHYLEN-5 ALPHA-ANDROSTAN-3-ONES AND INTERMEDIATES

[72] Inventor: Paul D. Klimstra, 1670 Chapel Court, Northbrook, Ill. 60062

[22] Filed: Sept. 2, 1971

[21] Appl. No.: 177,457

[52] U.S. Cl. ............260/397.3, 260/397.4, 260/999
[51] Int. Cl.............................................C07c 169/22
[58] Field of Search ......./Machine Searched Steroids

[56] References Cited
UNITED STATES PATENTS
3,356,694   12/1967   Lunn......................260/397.3

OTHER PUBLICATIONS
Edwards et al., J. Med. Chem., Vol. 6, pp. 178–182 (1963).

*Primary Examiner*—Henry A. French
*Attorney*—John M. Brown et al.

[57] ABSTRACT

The above-named compounds are manufactured from 17β-hydroxy-17α(optionally alkyl)-1α-methyl-5α-androstan-3-ones. The compounds of this invention exhibit valuable pharmacological properties, e.g., anti-estrogenic, anti-fungal and anti-hypercholesterolemic.

5 Claims, No Drawings

17-OXYGENATE-2-ALPHA-METHYL-2-METHYLEN-5 ALPHA-ANDROSTAN-3-ONES AND INTERMEDIATES

This invention is concerned generally with steroids of the androstane family and, more particularly, it is concerned with 17-oxygenated-1α-methyl-2-methylen-5α-androstan-3-ones and intermediates of the following structural formula

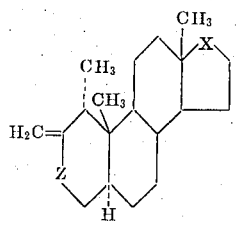

wherein X is a carbonyl radical or a radical of the formula

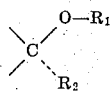

with $R_1$ being hydrogen or a lower alkanoyl radical, $R_2$ being hydrogen or a lower alkyl radical and Z being a carbonyl radical or a hydroxymethylene radical.

The lower alkyl radicals represented are methyl, ethyl, propyl, butyl, pentyl, hexyl, heptyl and the corresponding branched-chain isomers and the lower alkanoyl radicals intended are formyl, acetyl, propionyl, butyryl, caproyl, valeryl, heptanoyl and the branched-chain isomers thereof.

The compounds of this invention are manufactured by a series of steps beginning with the treatment of the appropriate member of the 17β-hydroxy-17α-(optionally alkyl)-1α-methyl-5α-androstan-3-one family, e.g., 17β-hydroxy-1α,17α-dimethyl-5α-androstan-3-one, with a strong base, such as sodium hydride, in the presence of ethyl formate, followed by neutralization with the addition of an aqueous mineral acid, such as hydrochloric acid, to yield the hydroxymethylene substituted compound, for example, 17β-hydroxy-1α,17α-dimethyl-2-hydroxymethylen-5α-androstan-3-one. Condensation of the enol with an amine, e.g., N-methylaniline, affords the 2-aminomethylen-3-oxo steroid which is reduced with a metallic hydride, such as sodium borohydride, to produce the 2-aminomethylene-3,17β-diol, e.g., 1α,17α-dimethyl-2-N-methylanilinomethylen)-5α-androstane-3,17β-diol. Contacting the diol with methanolic hydrogen chloride affords a mixture of the 2-methylene diol and the 2-formyl-Δ²-17β-ol which are separated by chromatography. Typical of this latter reaction is the conversion of 1α,17α-dimethyl-2-(N-methylanilinomethylen)-5α-androstane-3,17β-diol to 1α,17α-dimethyl-2-methylen-5α-androstane-3,17β-diol. Oxidation of the diol with an oxidizing agent, such as chromic acid, yields the 3-keto steroid, and when the 17α substituent is hydrogen, then the 3,17-dione is produced. This is illustrated by the chromic acid oxidation of 1α,17α-dimethyl-2-methylen-5α-andostane-3,17β-diol and 1α-methyl-2-methylen-5α-androstane-3,17β-diol to 17β-hydroxy-1α,17α-dimethyl-2-methylen-5α-androstan-3-one and 1α-methyl-2-methylen-5α-androstane-3,17-dione respectively.

The method of manufacturing the starting materials of this invention is disclosed in *Chem. and Pharm. Bull. Japan*, 10, 386 (1962).

The instant compounds are useful as pharmacological agents. For example, they exhibit anti-estrogenic, anti-fungal and anti-hypercholesterolemic properties. The anti-estrogenic utility is shown by a standardized test which is described in U.S. Pat. No. 3,539,558. The anti-fungal utility is shown by a standardized procedure described in U.S. Pat. No. 3,499,013, and the anti-hypercholesterolemic utility is determined by the procedure described in U.S. Pat. No. 3,462,466.

The invention will appear more fully from the examples which follow. They are not to be construed as limiting the invention in spirit or in scope as many modifications will be apparent to one skilled in the art. In the following examples, quantities of materials are given in parts by weight unless otherwise specified. Temperatures are in degrees Centigrade (°C.).

EXAMPLE 1

To a solution of 18 parts of 17β-hydroxy-1α-methyl-5α-androstan-3-one in 527 parts of benzene is added 33.2 parts of ethyl formate in 1 portion. That solution is stirred under a nitrogen atmosphere and 22.5 parts of a 50 percent sodium hydride in oil dispersion is added over a 5 minute period. The stirring is continued for 22 hours at room temperature, and then the solid material is removed by filtration, washed successively with benzene and hexane, and dried under reduced pressure at a temperature of about 60°. The solid is added to 142 parts of hydrochloric acid in 600 parts of water with rapid stirring continuing for a period of about 15 minutes, thus forming a dark, highly viscous material which is separated by decantation. This material is dissolved in ethyl acetate, and that solution is filtered through diatomaceous earth. The filtrate is washed with water and dried over anhydrous sodium sulfate and charcoal, and the solvent is removed yielding 17β-hydroxy-1α-methyl-2-hydroxymethylen-5α-androstan-3-one as an oil.

EXAMPLE 2

A solution of 16 parts of 17β-hydroxy-1α-methyl-2-hydroxymethylen-5α-androstan-3-one, 15.8 parts of freshly distilled N-methylaniline and 317 parts of methanol is refluxed for 4 hours. Then the solvent is removed under reduced pressure, thus affording 17β-hydroxy-1α-methyl-2-(N-methylanilinomethylen)-5α-androstan-3-one as an oil.

EXAMPLE 3

To 16 parts of 17β-hydroxy-1α-methyl-2-(N-methylanilinomethylen)-5α-androstan-3-one dissolved in 317 parts of methanol is added, with stirring and cooling in a water bath, a solution of 15 parts of sodium borohydride in 50 parts of water. Stirring is continued for about 3 hours, and then water is added. The solution is extracted with ether and the extracts are washed with water and dried over anhydrous sodium sulfate and charcoal. After solvent removal, 1α-methyl-2-(N-methylanilinomethylen)-5α-androstane-3,17β-diol remains as an oil.

EXAMPLE 4

A solution of 16 parts of 1α-methyl-2-(N-methylanilinomethylen)-5α-androstane-3,17β-diol and 317 parts of methanol is treated with 29.6 parts of hydrochloric acid. The solution is stirred for one-half hour and kept at room temperature by the addition of water. Additional water is added and then the solution is extracted with ether. The extracts are washed successively with water and 5 percent sodium bicarbonate solution and dried over anhydrous sodium sulfate and charcoal to yield, after solvent removal, a glass-like material. This material is taken up in benzene and chromatographed on a silica column to yield a mixture of 1α-methyl-2-methylen-5α-androstane-3α,17β-diol and 1α-methyl-cz-methylen-5α-androstane-3β,17β-diol. Also separated in the fractionation is 1α-methyl-2-formyl-5α-androst-2-en-17β-ol.

EXAMPLE 5

A solution of 18 parts of 17β-hydroxy-1α,17α-dimethyl-5α-androstan-3-one and 527 parts of benzene is treated with 33.2 parts of ethyl formate, which is added in one portion, and 22.5 parts of a 50 percent sodium hydride in oil dispersion, which is added over a 5 minute period with stirring under a nitrogen atmosphere. The mixture is continuously stirred at room temperature for 22 hours. The resultant sodium salt which forms is separated by filtration, washed with benzene and then hexane and dried at 50° under reduced pressure for 3 hours. The salt then is added to a stirred solution of 142 parts of hydrochloric acid and 1,200 parts of water, and the precipitate is collected, washed with water and air dried, thus yielding 11β-hydroxy-1α,17α-dimethyl-2-hydroxymethylen-5α-androstan-3-one. This compound is characterized by an ultraviolet absorption band at 286 millimicrons with a molecular extinction coefficient of 4,200.

EXAMPLE 6

A solution of 18 parts of 17β-hydroxy-1α,17α-dimethyl-2-hydroxymethylen-5α-androstan-3-one, 396 parts of methanol and 17.7 parts of freshly distilled N-methylaniline is refluxed for 5 hours. The solution is cooled and the solvent is removed to produce crude 17β-hydroxy-1α,17α-dimethyl-2-(N-methylanilinomethylen)-5α-androstan-3-one.

18 parts of the above crude product is dissolved in 356 parts of methanol, and to this solution is added, over a period of about 25 minutes with stirring and with cooling in a cold water bath, 18 parts of sodium borohydride dissolved in 50 parts of water. The solution is stirred at room temperature for an additional 2½ hours and water is added. Then the solution is extracted with ether and the extracts washed with water and dried over anhydrous sodium sulfate and charcoal. After solvent removal, 1α,17α-dimethyl-2-(N-methylanilinomethylen)-5α-androstane-3,17β-diol remains as an oil.

EXAMPLE 7

To 18 parts of 1α,17α-dimethyl-2-(N-methylanilinomethylen)-5α-androstane-3,17β-diol in 317 parts of methanol, cooled in a water bath, is added, dropwise over a 5 minute period and accompanied by stirring, 23.7 parts of hydrochloric acid. The solution is stirred for about 10 minutes. Then water is added and the solution extracted with ether. The extracts are washed with water and a 5 percent sodium bicarbonate solution and dried over anhydrous sodium sulfate. Solvent is removed to leave an oil which, when taken up in benzene and chromatographed on silicon dioxide, yields, 1α,17α-dimethyl-2-methylen-5α-androstane-3β,17β-diol and 1α,17β-dimethyl-2-methylen-5α-androstane-3α,17β-diol as a mixture. Also separated in that fractionation is 1α,17α-dimethyl-2formyl-5α-androst-2-en-17β-ol.

EXAMPLE 8

By substituting an equivalent quantity of 17α-ethyl-17β-hydroxy-1α-methyl-5α-androstan-3-one as a starting material, and otherwise following the procedure of Example 5, Example 6, and Example 7, there is produced 17α-ethyl-1α-methyl-2-methylen-5α-androstane-3α,17β-diol and 17α-ethyl-1α-methyl-2-methylen-5α-androstane-3β,17β-diol as a mixture.

EXAMPLE 9

To a solution of 5.5 parts of 1α-methyl-2-methylen-5α-androstane-3,17β-diol and 73.4 parts of acetone, cooled in an ice bath, is added an excess of 4 N chromic acid. The solution then is allowed to warm to room temperature and is stirred for 4 hours. After that time, isopropanol is added to destroy the excess chromic acid and the solution is filtered through diatomaceous earth. Then water is added to the filtrate and upon cooling a solid forms. This material is dissolved is methanol and charcoal is added. After filtering the mixture through diatomaceous earth, followed by the addition of water and cooling, 1α-methyl-2-methylen-5α-androstane-3,17-dione is afforded as crystals. This compound is distinguished by an absorption band in the ultra-violet spectrum at about 225 millimicrons with a molecular extinction coefficient of 5,000 and is represented by the following structural formula

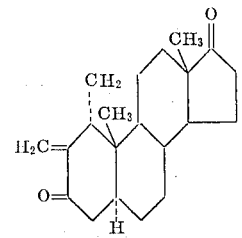

EXAMPLE 10

A solution of 4 parts of 1α,17α-dimethyl-2-methylen-5α-androstane-3,17β-diol and 79.2 parts of acetone, cooled in an ice bath, is treated with an excess of chromic acid. That solution is allowed to warm to room temperature and is stirred for about 4 hours. Then it is filtered through diatomaceous earth and aqueous 5 percent sodium bicarbonate solution is added to the filtrate. The oil which forms is extracted with ether and an emulsion forms. The extract is separated, washed successively with dilute hydrochloric acid, water and a 5 percent sodium bicarbonate solution and dried over anhydrous sodium sulfate and charcoal. After solvent removal, an oil remains which solidifies upon standing. Pure 17β-hydroxy-1α,17α-dimethyl-2-methylen-5αandrostan-3-one is obtained upon recrystallization from a methanol-water solution and displays an absorption band in the ultraviolet spectrum at about 226 millimicrons with a molecular extinction coefficient of 3,000. This compound is represented structurally by the following formula

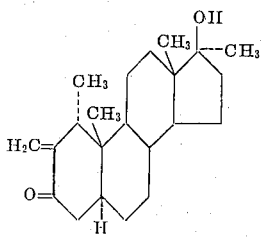

EXAMPLE 11

When an equivalent quantity of 17α-ethyl-1α-methyl-2-methylen-5α-androstane-3,17β-diol is substituted in the procedure of Example 10, there is obtained 17β-hydroxy-17α-ethyl-1α-methyl-2-methylen-5α-androstan-3-one.

EXAMPLE 12

A solution of 1.0 part of 17β-hydroxy-1α-methyl-2-(N-methylanilinomethylen)-5α-androstan-3-one, 10 parts of pyridine and 5 parts of acetic anhydride is allowed to stand at room temperature for about 12 hours. After that time, ice and water are added to the solution and the mixture is extracted with ether. The ethereal extracts are washed with water and dried over anhydrous sodium sulfate. Solvent removal under reduced pressure yields 1α-methyl-2-(N-methylanilinomethylen)-3-oxo-6α-androstan-17β-ol 17-acetate as an oil. That compound exhibits absorption bands in the infrared spectrum at about 3.42, 5.25, 5.85 and 7.92 microns.

EXAMPLE 13

When an equivalent quantity of 1α-methyl-2-(N-methylanilinomethylen)-3-oxo-5α-androstan-17β-ol 17-acetate is substituted in the procedure of Example 3, there is produced 1α-methyl-2-(N-methylanilinomethylen-5α-androstane-3,17β-diol 17-acetate.

EXAMPLE 14

By substituting an equivalent quantity of 1α-methyl-2-(N-methylanilinomethylen)-6α-androstane-3,17β-diol 17-acetate in the procedure of Example 4, 1α-methyl-2-methylen-5α-androstane-3,17β-diol 17-acetate is obtained.

EXAMPLE 15

Substitution of an equivalent quantity of 1α-methyl-2-methylen-5α-androstane-3,17β-diol 17-acetate in the procedure of Example 9 affords a mixture of 1α-methyl-2-methylen-3-oxo-5α-androstan-17β-ol 17-acetate and 1α-methyl-2-methylen-5α-androstane-3,17-dione. That mixture is chromatographed on neutral alumina to yield fractions of 1α-methyl-2-methylen-3-oxo-5α-androstan-17β-ol 17-acetate and 1α-methyl-2-methylen-5α-androstane-3,17-dione, the latter product being identical to the product of Example 9.

EXAMPLE 16

To a stirred solution of 1.0 part of 1α-methyl-2-methylen-3-oxo-5α-androstan-17β-ol 17-acetate in 15.8 parts of methanol, cooled to about 15° in an ice bath, is added a solution of 0.2 part of potassium carbonate dissolved in 2 parts of water, dropwise, over a 10 minute period. Then the solution is allowed to warm to room temperature and stand for about 16 hours after which time water and ice are added. The solid which forms is collected by filtration, washed with water and air dried. Recrystallization from aqueous methanol affords 1α-methyl-2-methylen-3-oxo-5α-androstan-17β-ol. That material absorbs in the ultraviolet spectrum at about 226 millimicrons with a molecular extinction coefficient of about 3,400 and further displays infrared absorption bands at about 3.25, 3.42, 5.90 and 6.01 microns.

EXAMPLE 17

By substituting an equivalent quantity of propionic anhydride in the procedure of Example 12 and otherwise following the procedures outlined in Examples 12, 13, 14 and 15, there is obtained 1α-methyl-2-methylen-3-oxo-5α-androstan-17β-ol 17-propionate.

What is claimed is:

1. A compound of the formula

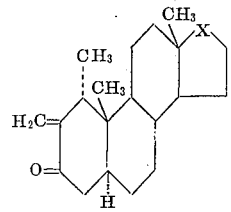

wherein X is selected from the group consisting of a carbonyl radical and radicals of the formula

with $R_1$ being selected from the group consisting of hydrogen and lower alkanoyl radicals and $R_2$ being selected from the group consisting of hydrogen and lower alkyl radicals.

2. As in claim 1, a compound of the formula

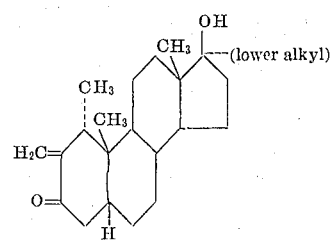

3. As in claim 1, a compound of the formula

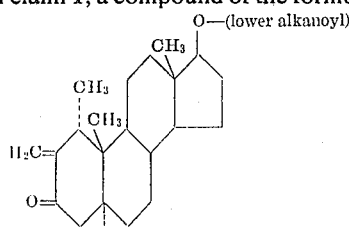

4. As in claim 1, the compound which is 1α-methyl-2-methylen-5α-androstane-3,17-dione.

5. As in claim 1, the compound which is 17β-hydroxy-1α,17α-dimethyl-2-methylen-5α-androstan-3-one.

* * * * *